United States Patent [19]

Lin

[11] Patent Number: 5,569,642
[45] Date of Patent: Oct. 29, 1996

[54] SYNTHETIC PARAFFINIC HYDROCARBON DRILLING FLUID

[75] Inventor: Kaung-Far Lin, Baton Rouge, La.

[73] Assignee: Albemarle Corporation, Richmond, Va.

[21] Appl. No.: 345,963

[22] Filed: Feb. 16, 1995

[51] Int. Cl.$^6$ ................................................ C09K 7/02
[52] U.S. Cl. ........................................ 507/103; 507/905
[58] Field of Search ................................ 507/103, 905

[56] References Cited

U.S. PATENT DOCUMENTS

| | | | |
|---|---|---|---|
| 4,787,990 | 11/1988 | Boyd | 507/103 |
| 4,876,017 | 10/1989 | Trahan et al. | 507/103 |
| 5,096,883 | 3/1992 | Mercer et al. | 507/103 |
| 5,189,012 | 2/1993 | Patel et al. | 507/103 |
| 5,333,698 | 8/1994 | Van Slyke | 507/103 |
| 5,498,596 | 3/1996 | Ashjian et al. | 507/103 |

*Primary Examiner*—Philip Tucker
*Attorney, Agent, or Firm*—Philip M. Pippenger

[57] ABSTRACT

An environmentally friendly invert drilling fluid comprises a water-in-oil emulsion which includes (a) at least 50 volume percent of a low toxicity base oil, and (b) at least one additive selected from the group consisting of emulsifiers, viscosifiers, weighing agents, oil wetting agents and fluid loss preventing agents, at least about 25 weight percent of the base oil content of the drilling fluid being a mixture of a linear alkane combined with a branched chain alkane, the alkanes individually having from about 14 to about 30 carbon atoms.

8 Claims, 2 Drawing Sheets

SYNTHETIC PARAFFINIC HYDROCARBON DRILLING FLUID

The invention relates to improved drilling fluids used in the drilling of oil and gas wells as well as other drilling fluid applications and drilling procedures. The invention is particularly concerned with non-polluting, minimally toxic drilling fluids which are based on synthetic hydrocarbons, derived from olefinic monomers and displaying functional characteristics, e.g., viscosity characteristics, acceptable in drilling fluid applications. The olefinic monomers are from the groups consisting of a carbon chain from $C_6$ to $C_{20}$ having at least one polymerizible double bond. The oligomeric or polymeric synthetic hydrocarbons thus obtained from olefins possess valuable rheological properties when used in drilling fluids.

Historically, first crude oils, then diesel oils and, most recently, mineral oils have been used in formulating invert drilling fluids (oil based muds). Due to problems of toxicity and persistence which are associated with these oils, and which are of special concern in off-shore use, the industry is developing drilling fluids which use "pseudo-oils" for the oil phase. Examples of such oils are fatty acids esters and branched chain synthetic hydrocarbons such as polyalphaolefins. Fatty acid ester based oils have excellent environmental properties, but drilling fluids made with these esters tend to have lower densities and are prone to hydrolytic instability. Polyalphaolefin-based drilling fluids can be formulated to high densities, have good hydrolytic stability and low toxicity. They are, however, somewhat less biodegradable than esters, they are expensive and the fully weighted, high density fluids tend to be overly viscous. U.S. Pat. No. 5,096,883 discloses the use of such branched chain synthetic, hydrogenated oils which have the advantage, over most natural petroleum base oils, of being considered "non-toxic" in that they pass the standard "Ninety-Six Hour Static Bioassay" test for mortality of mysid shrimp. The toxicity of natural oils is indicated to be due to the presence of aromatics and n-olefins in such oils.

U.S. Pat. No. 5,189,012 discloses that drilling mud can be manufactured by oligomerizing alpha-olefins or other olefins thereby producing mixtures of branched hydrocarbon molecules that are even multiples of the starting olefin. This patent further discloses that as an example of such oligomerization, a synthetic oil made from a $C_8$ olefin contains only a mixture of molecules that are $C_8$, $C_{16}$, $C_{24}$, $C_{32}$ etc. and such can be hydrogenated to achieve complete saturation or partially hydrogenated or left unhydrogenated. The thrust of this patent is that nonpolluting drilling fluids are branched chain oligomers synthesized from one or more olefins containing a $C_2$ to $C_{14}$ chain length. Also see U.S. Pat. No. 5,096,883 which teaches synthetic drilling fluids composed of branched paraffins containing between about 16 and about 40 carbon atoms.

Figure 1:
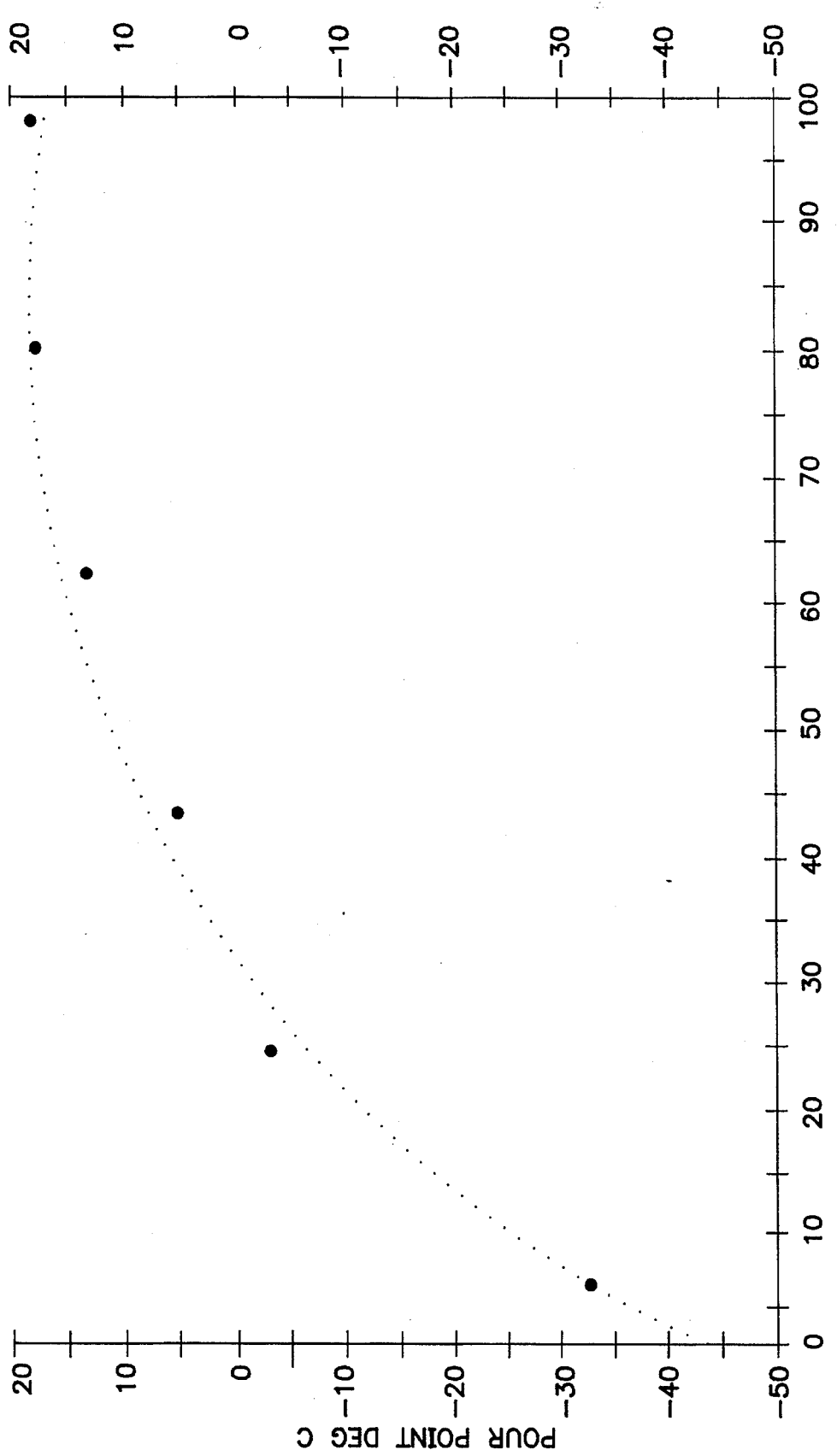
FIG. 1. A plot of the pour point of mixtures with 7-methyl pentadecane with n-hexadecane.

We have now found that less expensive drilling fluids having excellent technical and environmental properties can be formulated by using a mixture of a linear aliphatic alkane (also referred to herein as "paraffin") combined with a branched chain aliphatic alkane as part of or all of the base oil phase. Contrary to the suggestion in U.S. Pat. No. 5,096,883, the paraffinic mixtures of the present invention having carbon numbers of $C_{14}$ and above were found to have a sufficiently low toxicity so as to pass the mysid shrimp toxicity testing standards.

The mixtures referred to herein have from about 1 weight percent linear alkane to total weight of linear and branched alkanes combined to about 99 weight percent linear alkane. Preferably about 5 weight percent to about 75 weight percent linear alkane is used, most preferably about 5 to 50 weight percent.

In accordance with this invention there is provided an invert drilling fluid which comprises a water-in-oil emulsion which includes (a) at least 50 volume percent of a low toxicity base oil, and (b) at least one additive selected from the group consisting of emulsifiers, viscosifiers, weighing agents, oil wetting agents and fluid loss preventing agents, at least about 25 volume percent of the base oil content of the drilling fluid being a mixture of one or more linear aliphatic paraffins and one or more branched aliphatic paraffins, the paraffins individually having from about 14 to about 30 carbon atoms in the chain.

Also provided is a method of lubricating a drill pipe when drilling a well, which method comprises circulating an invert drilling fluid throughout a borehole while simultaneously rotating a string of drill pipe having a drill bit on its lower end in contact with the bottom of the base hole so as to reduce the friction between the pipe and the sides of the borehole and to remove cuttings from the borehole, wherein said invert drilling fluid comprises a water-in-oil emulsion which includes (a) at least 50 volume percent of a low toxicity base oil, and (b) at least one additive selected form the group consisting of emulsifiers, viscosifiers, weighing agents, oil wetting agents and fluid loss preventing agents, at least about 25 weight percent of the base oil content of the drilling fluid being a mixture of one or more linear alkanes and one or more branched alkanes, the hydrocarbons individually having from about 14 to about 30 carbon atoms in the chain.

In contrast to branched-chain paraffins, straight-chain, saturated alkanes are known as "normal paraffins" or "n-paraffins." Although, as a rule, none of the paraffins reacts readily with acids and oxidizing agents, it is important to understand that at least some of the physical properties of the branched-chain paraffins are very much different than those of corresponding n-paraffins having the same numbers of carbon atoms per molecule. In this respect, branched chain paraffins having up to about 40 carbon atoms per molecule are liquids over the temperature range of interest for drilling fluids; whereas, n-paraffins having more than about 16 carbon atoms are waxy solids, with refined paraffin wax consisting of n-paraffins having at least about 23 carbon atoms per molecule. Consequently, it has been thought that the use of only branched-chain paraffins, instead of n-paraffins, could be particularly advantageous for drilling fluids which are required to maintain a relatively low-viscosity over a wide temperature range. A mixture of such materials was never believed to be advantageous.

Invert drilling fluids contain at least 50 volume %, and typically about 65 to 95 volume % of a base oil as the continuous phase, no more than about 50 volume % of water, and various drilling fluid additives such as emulsifiers, viscosifiers, alkalinity control agents, filtration control agents, oil wetting agents and fluid loss preventing agents. The base oils usually have kinematic viscosities of from about 0.4 to 6.0 cSt at 100° C. According to this invention, at least about 25 volume percent and, preferably, 75 volume percent or more of the base oil comprises a mixture of one or more linear alkanes and one or more branched alkanes, the alkanes individually having from about 14 to about 30 carbon atoms and, preferably, from about 14 to 20 carbon atoms in the chain. The preferred mixtures, such as mixtures of $C_{14}$, $C_{14-16}$, $C_{14-24}$, and $C_{16-18}$ paraffins are individually commercially available.

It is preferred for the branched paraffins that the branching is a methyl group such located near the center of the hydrocarbon backbone of the materials.

A parameter important to the selecting of base-oils useful for formulating the drilling fluid of the present invention is kinematic viscosity (which, at 40° C., is preferably at least about 0.4 centistoke (cSt) to enable the suspension of particulates, such as drill cuttings, in the drilling fluid in which the oil-base is used. Although limited at the upper end by the number of carbon atoms present in the molecules which form the base-oil, the maximum oil viscosity is preferably no more than about 16.5 cSt at 40° C. so that excessive power is not required to pump a drilling fluid comprised of the oil.

Another important parameter of the drilling fluid base-oil is its pour point (a measure of the lowest temperature at which a fluid flows), an oil having a pour point of less than about −5° C. being preferred to enable use of the drilling fluid under cold temperature conditions. Furthermore, for operating safety reasons, the base-oil should have a relatively high flash point, a flash point of at least about 90° C. (194° F.) being preferred.

However, using the mixture of linear paraffins and branched paraffins has the advantage of lowering the viscosity of the mud to provide improved pumpability in use when compared to, for example, muds which use solely polyalphaolefin oils (PAO's) such as hydrogenated 1-decene dimer, whose kinematic viscosity of 1.8 cSt at 100° C. is higher than optimum. In contrast, the 100° C. viscosities of the $C_{14}$ to $C_{20}$ mixtures of the present invention range from about 0.85 to 2.85 cst. The mixtures of the present invention also have better toxicity compared to the PAO's which have a branched chain structure. The mixture of linear and branched alkanes can be used either alone or in combination with other low-toxicity base oils such as, for example, low-toxicity mineral oils, esters and PAO's to improve the performance of the drilling fluid and/or lower costs.

The invention is further illustrated by, but is not intended to be limited to, the following example.

This Example is illustrative of the base oil where the content of linear normal paraffin is balanced with the branched paraffin to give low pour point, low viscosity and high flash point. In this particular example, the carbon number is $C_{16}$. The branched paraffin is a single methyl branch near the center of the backbone of paraffin:

EXAMPLE

High purity $C_{16}$ vinylidene is dimerized at 120° C. from 1-octene catalyzed by TNOA (Tri Normal Octyl Aluminum) in a batch, glassware reactor according to the method described in U.S. Pat. No. 4,973,788, K. F. Lin et al. At the end of the reaction (90% 1-octene conversion), the catalyst is killed by caustic wash. After the phase separation, the organic portion is distilled to remove octenes (1-octene and 2-octene) from the dimers ($C_{16}$ vinylidene and $C_{16}$ deep internal olefins).

The high purity vinylidene dimer is then hydrogenated with nickel catalyst to give 93.9 weight percent 7-methyl-pentadecane (a $C_{16}$ branched paraffin from hydrogenation of $C_{16}$ vinylidene olefin, 2-hexyl-1-decene) and 4.8 wt % n-hexadecane (a $C_{16}$ linear paraffin from hydrogenation of $C_{16}$ deep internal olefins, hexadecene-6 and hexadecene-7).

A portion of the 93.9 wt % purity 7-methylpentadecane solution is further blended with various ratios of n-hexadecane to produce samples with various linear/branched contents. The pour points and viscosities as a function of weight percent n-hexadecane are shown in Table I for this particular binary system. The

TABLE I

Pour Points and Viscosities as a Function of Composition for the N-Hexadecane and 7-Methyl Pentadecane Binary System

| N-Hexadecane Wt % | 7-Methyl Pentadecane Wt % | Pour Point °C. | Viscosity cSt @ 40° C. | @ 100° C. |
| --- | --- | --- | --- | --- |
| 99.0 | 0 | 18 | 2.942 | 1.241 |
| 80.3 | 19.1 | 15 | 2.891 | 1.225 |
| 61.6 | 37.6 | 12 | 2.862 | 1.210 |
| 42.6 | 56.4 | 6 | 2.835 | 1.195 |
| 23.8 | 75.1 | −3 | 2.805 | 1.179 |
| 4.8 | 93.9 | −33 | 2.776 | 1 163 |

Figure 2:
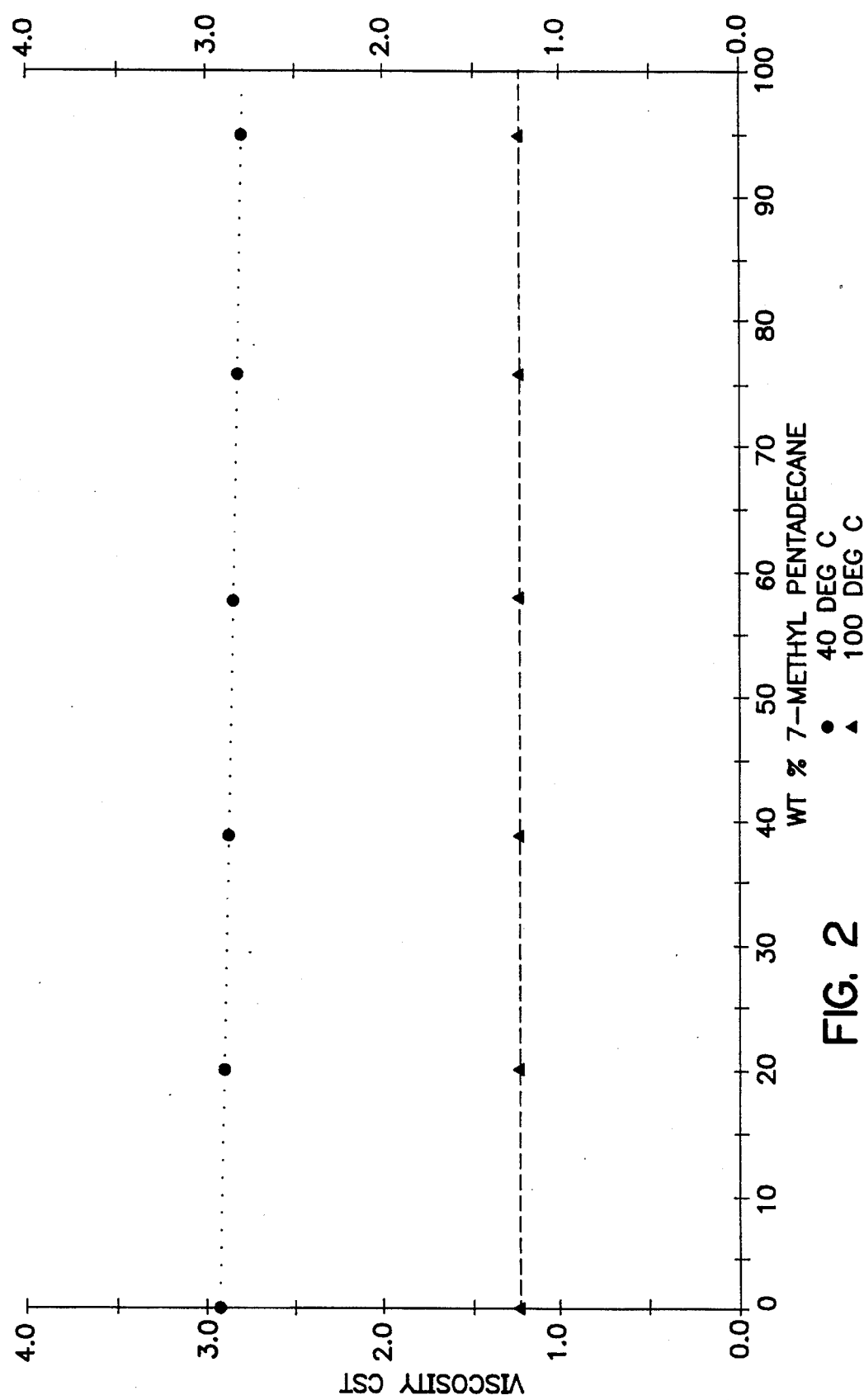
FIG. 2. A plot of the viscosities of mixtures of 7-methyl pentadecane with n-hexadecane.

*Note that flash points remain about 132° C. through the composition range same data are also shown graphically in FIGS. 1 and 2 for pour points and viscosities, respectively. The data show that viscosities remain essentially unchanged over the entire composition range. However, the pour points are a strong function of composition, ranging from 18° C. for 99 wt % pure n-hexadecane to −33° C. for 4.8 wt % n-hexadecane. Of particular interest to us is that a 19 wt % n-hexadecane (81 wt % 7-methylpentadecane) has a pour point of −10° C. Optimizing the pour point impacts significantly the economics of dimerization process.

The physical and environmental properties of some linear alpha-olefin (LAO) oils, and mixtures of LAO and PAO and of linear alkanes with branched alkanes, compared to a low toxicity mineral base oils and a PAO base oil, are reported in Table II wherein the percentages of each oil in the base oil are in volume percent.

TABLE II

| | OIL | | | | | | |
| --- | --- | --- | --- | --- | --- | --- | --- |
| Property | $C_{14}$LAO[1] | $C_{16-18}$ LAO[2] | 25% $C_{16-18}$ LAO[2]- 75% PAO[3] | KFL[4] | KFL[5] | PAO[3,6] | Clairsol 350M[7] Oil |
| Visc. @ 40° C. (Cst) | 1.87 | 3.08 | 4.48 | 2.78 | 2.80 | 5.5 | 1.80 |
| Visc. @ 100° C. (Cst) | 0.87 | 1.29 | 1.60 | 1.16 | 1.17 | 1.8 | 0.84 |
| Pour Point (°C.) | −18 | 3 | −18 | −33 | −10 | <−65 | −39 |
| Flash Point (°C.) | 107 | 146 | 146 | 132 | 132 | 155 | 76 |

TABLE II-continued

| Property | C$_{14}$LAO[1] | C$_{16-18}$ LAO[2] | OIL 25% C$_{16-18}$ LAO[2]- 75% PAO[3] | KFL[4] | KFL[5] | PAO[3,6] | Clairsol 350M[7] Oil |
| --- | --- | --- | --- | --- | --- | --- | --- |
| closed cup Biodegradability (%) | 65 | 77 | 83 | — | — | 75 | 90 |
| Test Method | DECD 301 | DECD 301 | CEC-1-33-A-94 | | | CEC-L-33-A-94 | CEC-L-33-A-94 |
| Toxicity:(LC50) 96 h Mysid Shrimp in ppm of the SPP | 47,700 | 213,000 | 480,000 | 1,000,000 | — | 556,000 | 8,600 |

[1]Typically about 95% wt C$_{14}$ with 80 mol % minimum linear alpha-olefin
[2]Typically about 55/35/10 % by wt C$_{16}$/C$_{18}$/C$_{20}$ with 60 mol % minimum linear alpha-olefin
[3]DURASYN ® 162 polyalphaolefin from 1-decene
[4]95% 7-Methyl Pentadecane; 5% n-Hexadecane
[5]81% 7-Methyl Pentadecane; 19% n-Hexadecane
[6]Properties are product specification
[7]"Low-Toxicity" mineral oil It can be seen from the data reported in Table II that the mixture of linear and branched alkane oils (KFL[4] and KFL[5]) have best toxicity combined with low viscosity properties. Their physical properties are suitable for drilling fluids and the flash points at comparable viscosities are superior to -low-toxicity mineral oils.

Further, the most preferred compositions of this invention, illustrated by Table II, KFL[4] and KFL[5], are single carbon materials, i.e., they are substantially C16 alkanes. This single carbon composition is useful for detecting the contamination of drilling muds by naturally occurring oils, a unique property of these compositions.

The CEC (Coordinating European Council) L-33-A-94 protocol was developed to determine the persistence of 1-stroke outboard engine oil in aquatic environments. In recent years, results from this test have been applied more broadly. The test is fast becoming a standard for aquatic biodegradability for water insoluble materials. Note that this test is not a test of "ready biodegradability" but "comparative biodegradability." These terms are tightly defined by regulatory bodies.

The CEC-L-33-A-94 test procedure is summarized as follows: Test flasks, together with poisoned flasks (each in triplicate), containing mineral medium, test oil and inoculum are incubated for 0 to 21 days. Flasks containing calibration materials in the place of the test oil are run in parallel. At the end of the incubation times, the contents of the flasks are subjected to sonic vibration, acidified, and extracted with CCl$_4$ or R113. The extracts are then analyzed by Quantitative IR Spectroscopy, measuring the maximum absorption of the CH$_3$-band at 2930 cm$^{-1}$. The biodegradability is expressed as the % difference in residual oil content between the test flasks and the respective poisoned flasks at day 21.

Table II provides additional toxicity results for drilling muds, which contain 10% base oil in EPA's Generic Mud #7, according to the 96 hour LC$_{50}$ mysid shrimp acute toxicity test wherein the percentages of each oil in the base oil are in volume percent.

The NPDES (National Pollutant Discharge Elimination System) standard for discharge into the Gulf of Mexico is an LC$_{50}$>30,000 ppm (SPP, mysid shrimp, 96-hour acute toxicity). Drilling muds which meet this standard are considered to be non-toxic.

As shown in the data presented in Table II, the toxicities of comparison muds made with the mineral oil Clairsol 350M oil, and linear alpha-olefin oils which contained material having less than 14 carbon atoms, e.g. C$_{12}$C$_{26}$, and C$_{12}$C$_{14}$ mixtures failed to meet >30,000 ppm SPP standard established by NPDES for ocean disposal. KFL[4] achieves the best toxicity.

Besides the oil phase, the drilling fluid of the invention has a water phase of up to 50 volume percent (preferably about 5 to 35 volume percent), which contains up to about 35 to 38 wt. % (preferably about 20 to 35 wt. %), of sodium or calcium chloride. The water in oil emulsion is formed by vigorously mixing the base oil together with one or more emulsifying agents. Various suitable emulsifiers are known in the art and include, for example, fatty acid soaps, preferably calcium soaps, polyamides, sulfonates, triglycerides, and the like. The fatty acid soaps can be formed in situ by the addition of the desired fatty acid and base, preferably lime. The emulsifiers are generally used in amounts of from about 1 to 8 kilograms per cubic meter of drilling fluid.

The drilling fluids also include, as known in the art, one or more additives such as viscosifiers, weighing agents, oil wetting agents and fluid loss preventing agents to enable the fluids to meet the needs of particular drilling operations. The additives function to keep cutting and debris in suspension, provide the required viscosity, density and additive wetting properties to the fluid, and prevent the loss of liquids from the fluid due to the migration of the liquids into the formations surrounding the well bore.

Clay and polymer viscosifiers such as, for example, bentonite and attapugite (which are sometimes reacted with quaternary ammonium salts), polyacrylates, cellose derivatives, starches, and gums can be used in amounts of from about 0.5 to 5 kilograms per cubic meter of drilling fluid.

The density of the drilling fluid can be increased by using weighing agents such as barite, galena, iron oxides, siderite and the like, to give densities ranging from about 950 to 2400 kilograms per cubic meter of drilling fluid.

In order to assist in keeping solid additives in suspension in the drilling fluid, oil wetting agents, such as lecithin or organic esters of polyhydric alcohols, can be added in amounts of up to about 4 kilograms per cubic meter of drilling fluid.

Fluid loss agents, such as organophilic humates made by reacting humic acid with amides of polyalkylene polyamines, act to coat the walls of the bore hole and are used in amounts of up to about 7 kilograms per cubic meter of drilling fluid.

Three 13.4 ppg oil base (invert mud) drilling fluids were formulated using various synthetic hydrocarbons containing base oils according to the following formulations:

210 mL Synthetic Basestock
3 g VG-69 Organophilic Clay 6 g NOVAMUL Basic Emulsifier
1 g NOVAMOD Shear Rate Modifier
5 g Lime
8 g VERSALIG Lignite Fluid Loss Control Agent
70 mL 30% aq $CaCl_2$
297 g Barite NOVAMUL™ is a blend of emulsifiers, wetting agents, gellants, and fluid stabilizing agents. It requires the addition of lime which affords a calcium soap. It is a primary additive in "conventional" invert mud systems.

NOVAMOD™ is a shear rate modifier.

VERSALIG® is a lignite fluid loss control agent.

VG-69® is a viscosifier and gelling agent. It is a bentonite-based organophilic clay.

The above trademark registrations and trademark applications are products of MI Drilling Fluids Co.

The properties of the drilling fluids are reprinted in Table III below wherein the percentage of each oil in the base oil are in volume percent. Although the formulations were not optimized, the mixture of linear and branched hydrocarbon containing oils formed stable emulsions, and each responded to the viscosifier.

TABLE III

Testing of 13.4 ppg Muds Formulated with
Synthetic Hydrocarbon Oils (75/25 Oil/Water)

| FLUID | $C_{14}LAO^1$ | |
|---|---|---|
| Hot Rolled | $I^4$ | $HR^5$ |
| 600 rpm Dial Reading[6] | 10 | 11 |
| 300 rpm Dial Reading | 6 | 6 |
| 200 rpm Dial Reading | 4 | 4 |
| 100 rpm Dial Reading | 2.25 | 2.25 |
| 6 rpm Dial Reading | 0.75 | 0.75 |
| 3 rpm Dial Reading | 0.75 | 0.75 |
| Plastic Viscosity, cp | 4 | 5 |
| Yield Point, lb/100 ft² | 2 | 1 |
| Gel Strength, lb/100 ft² | 1/1 | 1/1 |
| Electrical Stability, V | 173 | 275 |

| TEST | DURASYN® 162[7] | | DURASYN® 162/168[8] | |
|---|---|---|---|---|
| RESULTS | I | HR | I | HR |
| 600 rpm Dial Reading | 69 | 58 | 61 | 54 |
| 300 rpm Dial Reading | 43 | 34 | 38 | 32 |
| 200 rpm Dial Reading | 33 | 36 | 29 | 24 |
| 100 rpm Dial Reading | 27 | 16 | 19 | 15 |
| 6 rpm Dial Reading | 7 | 4 | 6 | 4 |
| 3 rpm Dial Reading | 6 | 3 | 6 | 4 |

TABLE III-continued

Testing of 13.4 ppg Muds Formulated with
Synthetic Hydrocarbon Oils (75/25 Oil/Water)

| Plastic Viscosity, cp | 23 | 22 | 23 | 22 |
|---|---|---|---|---|
| Yield Point, lb/100 ft² | 20 | 12 | 15 | 10 |
| Gel Strength, lb/100 ft² | 10/21 | 5/12 | 8/19 | 7/14 |
| HPHT Filtrate @ 300° F., mL | 8.4 | 8.7 | 8.7 | 9.1 |
| Electrical Stability - volts | 1,251 | 1,247 | 1,223 | 1,297 |

[1]Typically about 95% wt $C_{14}$ with 80 mol % minimum linear alpha-olefin
[4]Initial value before hot rolling
[5]Hot rolled at 225° F. (107.2° C. for 16 hours)
[6]Fann Viscometer dial reading
[7]Albemarle Corporation, polyalphaolefin
[8]A ratio of 162/168 of 75/25

What is claimed is:

1. An invert drilling fluid which comprises at least 50 volume percent of a low toxicity base oil and at least one additive selected from the group consisting of emulsifiers, viscosifiers, weighing agents, oil wetting agents and fluid toss preventing agents, said base oil:

a) consisting essentially of a mixture of one or more synthetic linear paraffins and one or more synthetic methyl-branched paraffins, said paraffins individually having from about 14 to about 30 carbon atoms in the chain; and b) having a 96-hour Mysid shrimp toxicity, $LC_{50}$, of at least about 1,000,000 ppm in the SPP according to the 1985 test standard of the U.S. Environmental Protection Agency.

2. The fluid of claim 1 wherein said paraffins have from about 16 to 20 carbon atoms.

3. The fluid of claim 1 in which said linear paraffin and said branched paraffin have the same number of carbon atoms.

4. The fluid of claim 1 wherein said fluid contains from about 65 to 95 volume % base oil.

5. The fluid of claim 1 wherein said base oil has a kinematic viscosity at 100° C. of from about 0.4 to 6.0 cSt at 100° C.

6. The fluid of claim 1 wherein said mixture of paraffins consists of hexadecane and 7-methylpentadecane.

7. The fluid of claim 1 wherein said mixture of paraffins is selected from the group consisting of $C_{14}$, $C_{14-16}$, $C_{14-24}$, and $C_{16-18}$ paraffins.

8. A fluid of claim 1 having a kinematic viscosity of less than 1.24 cSt at 100° C.

* * * * *